United States Patent [19]

Ogawa

[11] 4,112,467
[45] Sep. 5, 1978

[54] FAILURE MODE CONTROL APPARATUS FOR ELECTRONIC GRAPHIC DATA TRANSMISSION SYSTEM

[75] Inventor: Mutsuo Ogawa, Tokyo, Japan

[73] Assignee: Ricoh Co., Ltd., Tokyo, Japan

[21] Appl. No.: 751,878

[22] Filed: Dec. 17, 1976

[30] Foreign Application Priority Data

Dec. 30, 1975 [JP] Japan .................................. 50/158565

[51] Int. Cl.² .................................................. H04N 1/32
[52] U.S. Cl. ................................. 358/257; 179/2 DP
[58] Field of Search ............... 358/256, 257; 179/2 DP

[56] References Cited

U.S. PATENT DOCUMENTS 3,529,087 9/1970 Kawase .................................. 358/257
3,962,534 6/1976 Ogawa .................................. 358/256

Primary Examiner—Howard W. Britton
Attorney, Agent, or Firm—Frank J. Jordan

[57] ABSTRACT

In a data transmission system comprising, for example, a facsimile transmitter connected to a facsimile receiver through a public telephone network, failure or malfunction sensors are provided at the transmitter and receiver which generate failure signals having the same frequency as the telephone network busy signal upon detection of a malfunction. Both the transmitter and receiver reset at high speed to an initial ready-for-transmission status upon reception of a failure signal from either sensor and automatically disconnect from the telephone network. The failure sensor at the receiver preferably comprises means for generating a failure signal when the failure rate of parity or other digital checks exceeds a predetermined value.

7 Claims, 7 Drawing Figures

TRANSMITTER

CALL

RECEIVE ANSWERBACK

SEND MODE DATA

RECEIVE READY SIGNAL

SEND DATA

RECEIVE HANG-UP SIGNAL

FAST FORWARD

SENSE COPY END

SET FAILURE ANNUNCIATOR

FAILURE MODE CONTROL APPARATUS FOR ELECTRONIC GRAPHIC DATA TRANSMISSION SYSTEM

BACKGROUND OF THE INVENTION

The present invention relates to a failure mode control apparatus for an electronic graphic data transmission system such as a facsimile system utilizing a public telephone network.

Fully automatic or unattended facsimile transmission systems utilizing public telephone networks have come into widespread use in many governmental and commercial applications. An original document for transmission is loaded into a scanning unit at the transmitter and a start button is depressed. The transmitter automatically dials the number of the intended receiver. The receiver automatically answers and establishes a telephone circuit. The original document is scanned by the scanning unit which generates electrical signals constituting a digital representation of the document. These signals are transmitted to the receiver and fed to a printer which reproduces a permanent paper copy or facsimile of the document.

Upon completion of scanning of the original document and transmission of the electronic data signals corresponding thereto, the transmitter disconnects itself from the telephone network and resets itself to an initial ready-for-transmission status. The receiver detects the breaking of the telephone circuit and also resets itself to an initial ready-for-transmission status in which the facsimile may be removed for use and fresh copy paper is fed to an operative position in the printer.

However, if a malfunction such as a paper jam or noise interference in the telephone network occurs, a conventional facsimile system is provided with means to automatically break the telephone connection and shut down the transmitter and receiver. In this condition, the receiver is not operable to receive another call and in a system in which each facsimile installation includes both a transmitter and a receiver the transmitting station is further inoperable to receive a call.

In order to overcome this problem the present applicant has proposed in his Japanese patent application No. 50-62509 a failure mode control system which resets both the transmitter and receiver to their initial status at high speed upon detection of disconnection of the telephone circuit by either the transmitter or receiver due to detection of a malfunction during transmission. Although the system provides excellent performance in practical application, it is relatively expensive to implement and is not applicable to low-cost installations.

In facsimile transmission in which the data signals are transmitted in the form of blocks of data bits, errors in the transmission of the blocks account for the great majority of transmission malfunctions which result in automatic disconnection. Apparatus malfunctions and paper jams account for a smaller percentage of disconnections. In applications in which side circuits are employed, the possibility of disconnection due to erroneous operation of switchboards in the public telephone network is quite small.

SUMMARY OF THE INVENTION

It is an object of the present invention to provide a failure mode control apparatus for a facsimile system or the like which detects transmission malfunctions, automatically terminates transmission in response thereto and quickly resets the system to an initial ready-for-transmission status.

It is another object of the present invention to provide a failure mode control system which is effective in operation and comparatively inexpensive to commercially manufacture.

It is another object of the present invention to provide a failure mode control system which detects erroneous transmission of data blocks and terminates transmission when the failure rate exceeds a predetermined level.

It is another object of the present invention to provide a generally improved failure mode control apparatus for an electronic data transmission system.

Other objects, together with the foregoing, are attained in the embodiment described in the following description and illustrated in the accompanying drawings.

DESCRIPTION OF THE PREFERRED EMBODIMENT

While the failure mode control apparatus of the invention is susceptible of numerous physical embodiments, depending upon the environment and requirements of use, substantial numbers of the herein shown and described embodiment have been made, tested and used, and all have performed in an eminently satisfactory manner.

Figure 1:
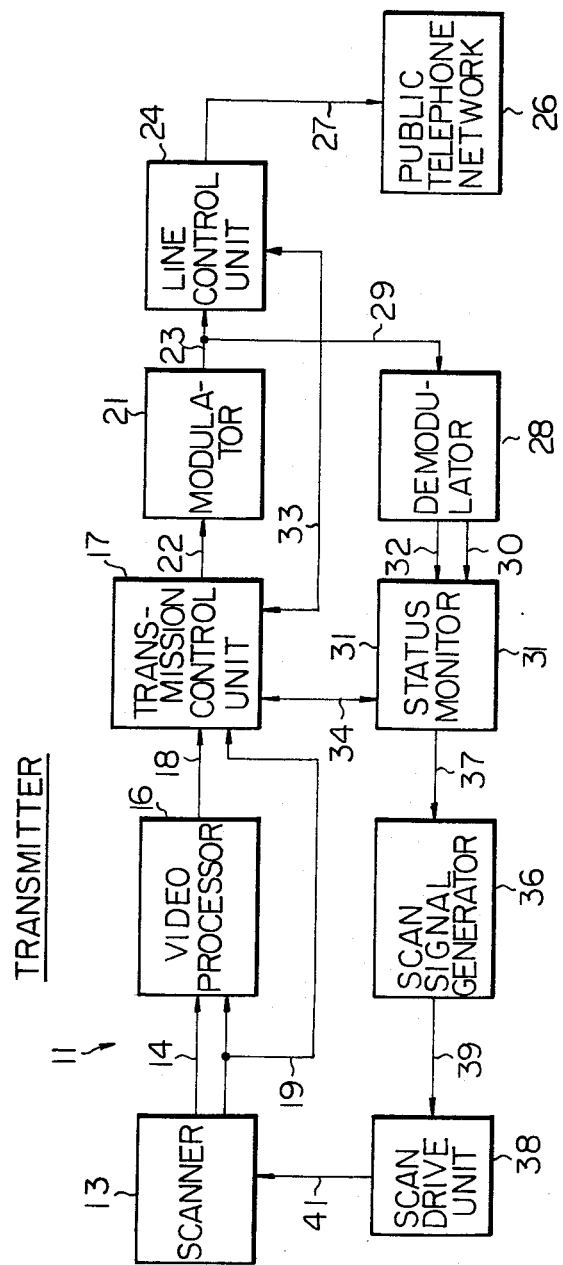
FIG. 1 is a block diagram of a transmitter of a facsimile system.
Figure 2:
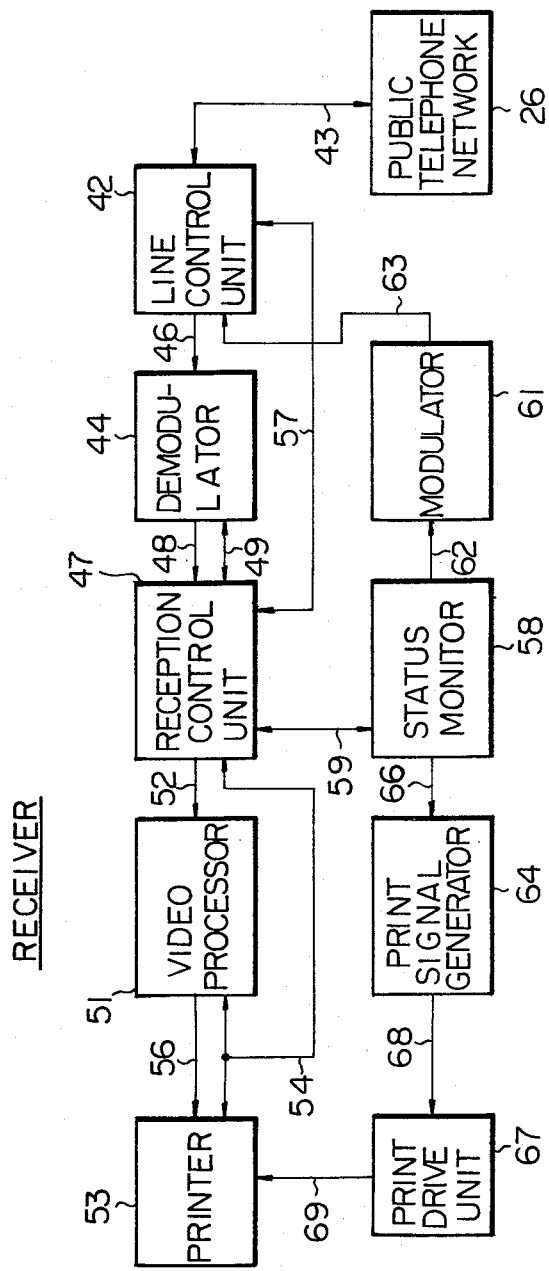
FIG. 2 is a block diagram of a receiver of the facsimile system.

A facsimile installation incorporating a failure mode control system according to the present invention comprises a transmitter 11 and a receiver 12 which are shown in block form in FIGS. 1 and 2 respectively. The transmitter 11 comprises a scanner 13 which is arranged to optically scan an original document (not shown) for facsimile transmission and generate electrical signals constituting an electronic digital representation of the document. Video signals are fed from the scanner 13 through a line 14 to a video processor 16, the output of which is connected to a transmission control unit 17 through a line 18. Synchronizing clock pulses are fed from the scanner 13 to both the video processor 16 and the transmission control unit 17 through a line 19. The output of the transmission control unit 17 is applied to a modulator 21 through a line 22 and fed from the modulator 21 through a line 23 to a line control unit 24 and fed therefrom to a public telephone network 26 through a line 27. The line control unit 24 is also connected to a demodulator 28 through a line 29, the demodulator 28 being connected to a status monitor 31 through lines 30 and 32. The transmission control unit 17 is interconnected with the line control unit 24 and the status monitor 31 through lines 33 and 34 respectively. The status monitor 31 is connected to control a scan signal generator 36 through a line 37. The scan signal generator 36 applies drive signals to a scan drive unit 38 through a line 39 which are utilized to control the scanning operation of the scanner 13 by means of a line 41.

The receiver 12 comprises a line control unit 42 which is connected to the public telephone network 26 through a line 43. The output of the line control unit 42 is fed to a demodulator 44 through a line 46. Demodulated video signals are fed to a reception control unit 47 through a line 48 and demodulated clock pulses are fed to the reception control unit 47 from the demodulator 44 through a line 49.

Video signals are applied from the reception control unit 47 to a video processor 51 through a line 52 and synchronization clock pulses are fed from the reception control unit 47 to the video processor 51 and a printer 53 through a line 54. Video signals are fed from the video processor 51 to the printer 53 through a line 56. The reception control unit 47 and the line control unit 42 are interconnected through a line 57.

The reception control unit 47 is connected to a status monitor 58 through a line 59. The status monitor 58 is connected to a modulator 61 through a line 62, the output of the modulator 61 being applied to the line control unit 42 through a line 63.

The status monitor 58 is also connected to control a print signal generator 64 through a line 66, the output of the print signal generator 64 being applied to a print drive unit 67 through a line 68. The print drive unit 67 is connected to the printer 53 through a line 69.

Figure 3:
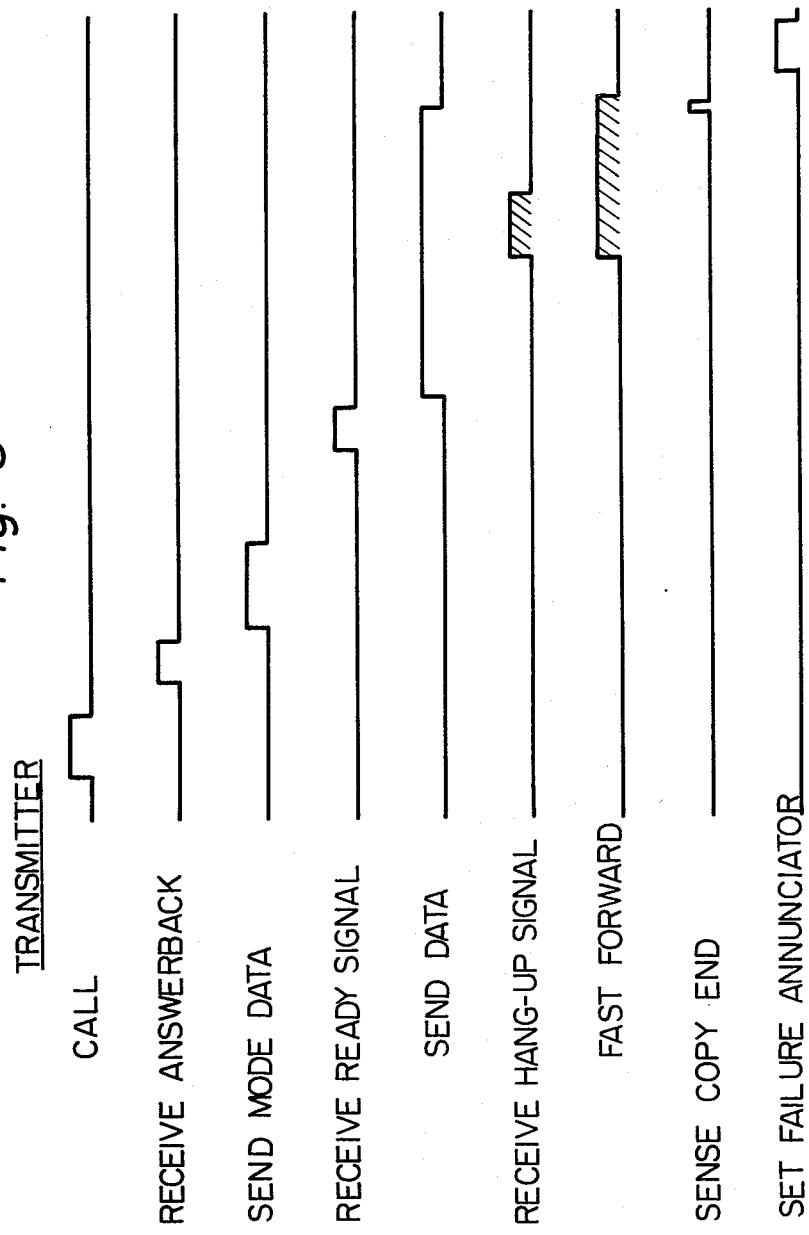
FIG. 3 is a timing diagram of the transmitter.
Figure 4:
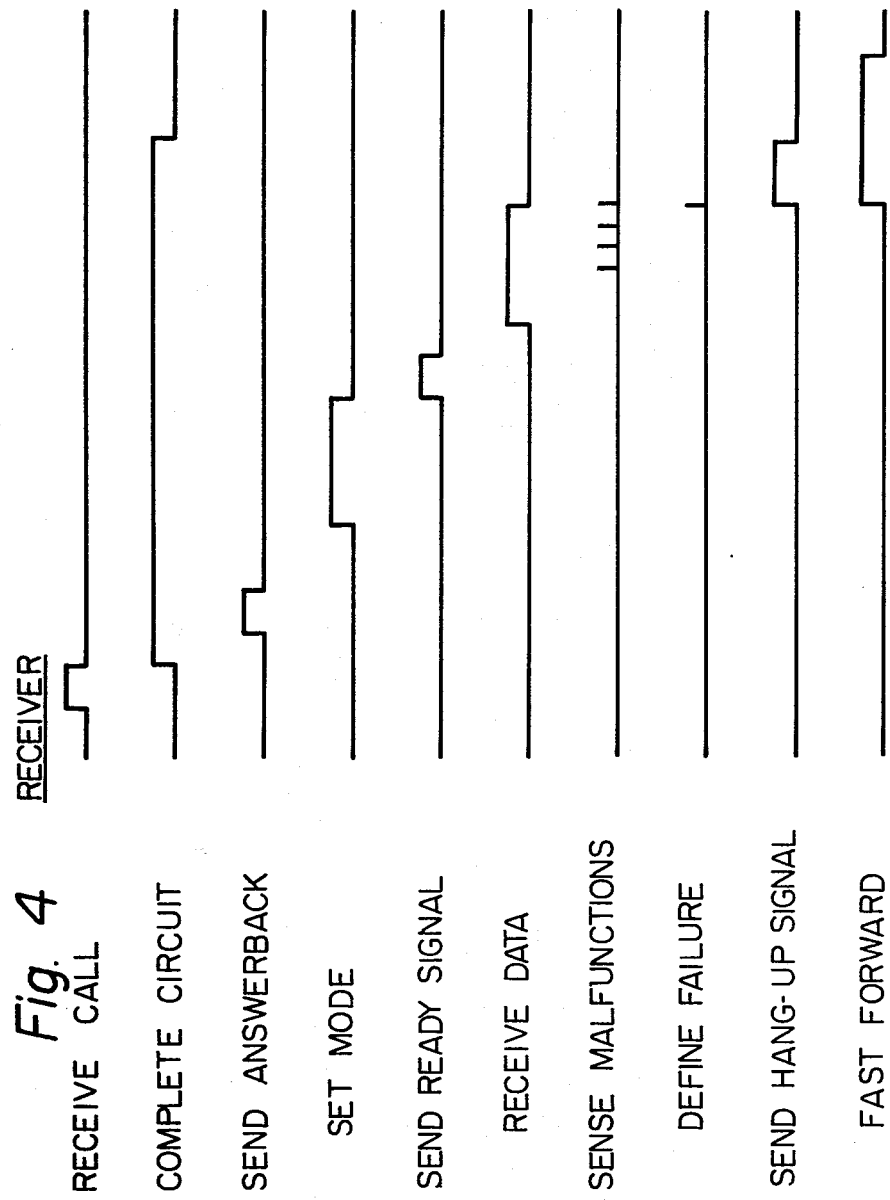
FIG. 4 is a timing diagram of the receiver.

The operation of the transmitter 11 and receiver 12 will now be described with reference also being made to FIGS. 3 and 4. Although each facsimile installation comprises both a transmitter 11 and a receiver 12, in order to simplify the description only the transmitter 11 of a sending facsimile installation and the receiver 12 of a remote receiving facsimile installation will be considered.

To initiate facsimile transmission, the operator of the transmitter 11 loads an original document (not shown) for facsimile transmission into the scanner 13, depresses a button (not shown) indicating the identification number of the facsimile installation to which the facsimile transmission is to be made and depresses a start button (not shown).

The telephone numbers of all of the facsimile installations in the users network are stored in the transmission control unit 17, and depression of the start button causes the line control unit 24 to connect the transmitter 11 to the public telephone network 26 and further causes the transmission control unit 17 to apply dial pulses to the telephone network 26 corresponding to the telephone number of the intended receiving facsimile installation through the modulator 21 and the line control unit 24, thereby calling the intended receiver.

The telephone network 26, in response to the dial pulses, feeds a ringing signal to the line control unit 42 of the receiver 12 of the called facsimile installation. The line control unit 42 in response to the ringing signal operatively connects the receiver 12 to the telephone network 26 thereby establishing a DC closed loop between the calling transmitter 11 and the called receiver 12. When the status monitor 58 of the receiver 12 detects that the telephone circuit has been completed, it feeds an answerback signal through the modulator 61 and line control unit 42 to the telephone network 26 which is applied to the status monitor 31 of the transmitter 11 through the line control unit 24 and the demodulator 28.

In response to the answerback signal, the status monitor 31 actuates the transmission control unit 17 to transmit handshaking data such as the required paper size, scan density, compression mode and the like to the receiver 12 through the modulator 21 and line control unit 24. This handshaking data is applied to the reception control unit 47 of the receiver 12 through the line control unit 42 and the demodulator 44 and sets the reception control unit 47 to the transmission parameters corresponding to the handshaking data so that the transmitter 11 and receiver 12 will operate in the same transmission mode. When this operation is completed, a signal is fed to the status monitor 58 from the reception control unit 47 which actuates the status monitor 58 to transmit a ready signal to the transmitter 11 through the modulator 61 and the line control unit 42. This ready signal is applied to the status monitor 31 of the transmitter 11 through the line control unit 24 and the demodulator 28 which actuates the transmitter 11 to begin transmission of graphic data.

The status monitor 31 actuates the scan signal generator 36 to apply scan drive signals to the scan drive unit 38 which drives the scanner 13 to scan the original document. The scanner 13 produces video signals corresponding to the light and dark areas of the document and also synchronization clock pulses which are fed to the video processor 16 and transmission control unit 17. The video processor 16 serves to effect video compression so that the facsimile transmission may be accomplished in a minimum amount of time. Preferably, the scan area of the document is divided into lines and the lines are divided into blocks of data bits. Only the lines and blocks containing necessary data are transmitted by means of compression by the video processor 16. Each transmitted block consists of a plurality of synchronizing bits, a flag bit, the bits constituting the actual video data and one or more check bits. The video block data and the clock pulses are applied to the modulator 21 by means of the transmission control unit 17 and are applied to modulate a carrier signal. The modulated carrier is fed to the receiver 12 through the line control unit 24 and the public telephone network 26.

The modulated carrier is applied to the demodulator 44 through the line control unit 42 and demodulated thereby, the video data and clock pulses being fed to the reception control unit 47. The clock pulses are applied to the printer 53 and also to the video processor 51 to synchronized the printer 53 to the scanner 13. The print signal generator 64 applies print drive signals to the print drive unit 67 which drives the printer 53 at the same speed as the scanner 13. The video processor 51 separates the actual video data from the synchronizing and check bits and performs an expansion or reverse compression operation so that the data which was removed by the video processor 16 in the compression operation is reconstructed and mixed with the transmitted data in proper sequence. The expanded video data is applied to the printer 53 which produces a permanent paper copy or facsimile of the original document. If a system malfunction or failure does not occur during the transmission operation, the scanner 13 will sense the end of the original document and feed a signal to the status monitor 31 which in turn produces a hang-up signal. In response to the end of the scanning operation the status monitor 31 also controls the scan signal generator 36 to produce signals which reset the scanner 13 to an initial ready-for-transmission status so that the original document may be removed and a new original document loaded for transmission.

The hang-up signal is fed to the receiver 12 through the modulator 21 and line control unit 24. After sending the hang-up signal, the transmission control unit 17 controls the line control unit 24 to disconnect the transmitter 11 from the telephone network 26.

The hang-up signal is applied to the status monitor 58 of the receiver 12 through the line control unit 42, demodulator 44 and reception control unit 47. In response, the status monitor 58 controls the print signal generator 64 to produce signals to reset the printer 53 to an initial ready-for-transmission status in which the finished facsimile or copy may be removed for use and a fresh section of copy paper moved to an operative position.

If, however, a failure or malfunction is detected by either the transmitter 11 or the receiver 12, the transmission operation is terminated and the system is rapidly reset to its initial status. The video processor 16 is designed to synthesize a check code from the data bits of each block and add the check code to the data bits in the form of check bits. The status monitor 58 of the receiver 12 comprises a similar circuit, as will be described in detail below, to synthesize the same check code from the data bits of each block as received. Although a simple parity check may be implemented in economy installations, a more complex check code is preferred and may be any known in the art. The status monitor 58 is further designed to compare the check bits of each received block with the internally synthesized check code. Coincidence indicates that the block was transmitted and received correctly and lack of coincidence indicates a transmission malfunction or failure.

A failure rate circuit is incorporated in the status monitor 58 to define a failure condition when the percentage of incorrectly transmitted blocks to correctly transmitted block exceeds a predetermined value. As shown in FIG. 4, four incorrectly transmitted blocks were detected and the failure condition was defined upon detection of the fourth failure.

Upon determination of the failure condition, the status monitor 58 generates a hang-up signal which preferably has the same frequency as the busy signal of the telephone network 26 and feeds this signal to the transmitter 11 through the modulator 61 and the line control unit 42. In addition, the status monitor 58 feeds a signal to the reception control unit 47 which controls the line control unit 42 to disconnect the receiver 12 from the telephone network 26 after the hang-up signal is sent out. The hang-up signal is preferably generated for one to three seconds and the reception control unit 47 is provided with a time delay function to ensure that the disconnection will not be effected until the hang-up signal is sent out.

The status monitor 58 also feeds a signal to the print signal generator 64 which feeds print drive signals to the print drive unit 67 to cause the printer 53 to be driven at a reset speed which is much higher than the normal print speed so that the printer 53 is reset to its initial condition rapidly. The printer 53 is de-energized upon reaching its initial or ready-for-transmission status. In this manner, the partially completed facsimile copy is discharged from the printer 53 and fresh paper is provided in an operative position in readiness for another transmission.

The hang-up signal which is fed from the receiver 12 to the transmitter 11 is demodulated by the demodulator 28 and applied to the status monitor 31 thereby indicating that the receiver 12 has detected a transmission failure and is about to hang-up. The status monitor 31 controls the scan signal generator 36 to feed signals to the scan drive unit 38 to cause the scanner 13 to be driven to its initial or ready-for-transmission position at a reset speed which is much higher than the scan speed. Upon detection of the end of the original document, the scanner 13 is stopped and a signal is fed to an annunciator (not shown) indicating to the operator of the transmitter 11 that the transmission ended in failure. The status monitor 31 also controls the line control unit 24 by means of the transmission control unit 17 to disconnect the transmitter 11 from the telephone network 26. With the transmitter 11 and receiver 12 reset to their initial ready-for-transmission status, a further attempt at facsimile transmission of the original document may be undertaken immediately, if desired.

Although the failure mode operation is described above utilizing as an example a failure detected by the receiver 12, the operation is essentially similar when a failure is detected by the transmitter 11. The transmitter 11 feeds a hang-up signal to the receiver 12, and both the transmitter 11 and receiver 12 reset to their initial status and disconnect from the telephone circuit. It will be noted that the receiver 12 will reset itself and disconnect in response to a hang-up signal in the same manner regardless of whether the hang-up signal was generated by the transmitter 11 to signal the end of normal transmission or a failure. The transmitter 11 may be designed to sense failure conditions such as a paper jam, power failure or the like as may the receiver 12. Where the hang-up signal has the same frequency as the telephone network 26 busy signal, the transmitter 11 may be controlled to reset to its ready-for-transmission status without the need of additional control circuitry when the called receiver 12 is engaged in a transmission operation with another facsimile installation and the telephone network 26 feeds a busy signal to the calling transmitter 11.

Figure 5:
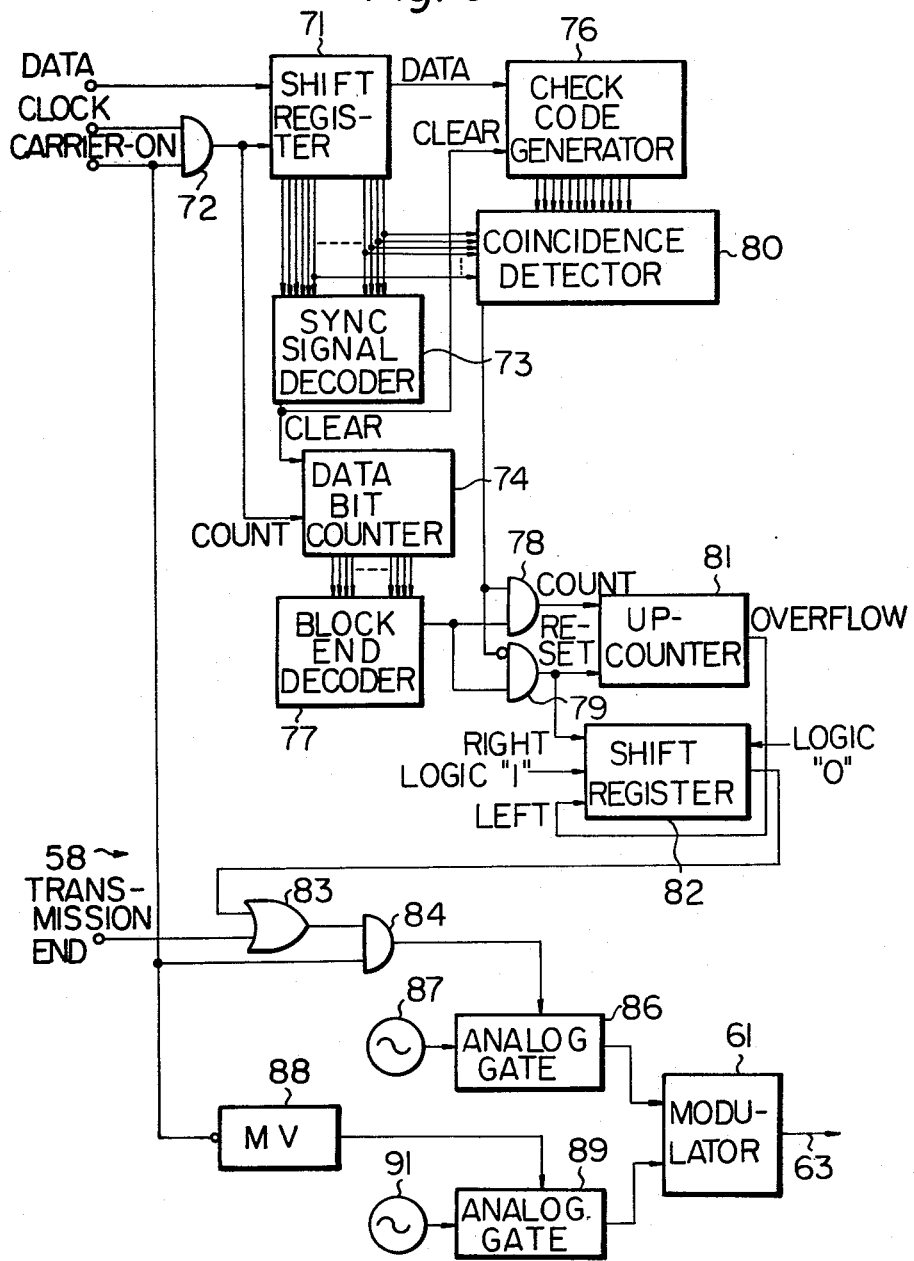
FIG. 5 is an electrical schematic diagram, partially in block form, of a status monitor of the receiver.
Figure 6:
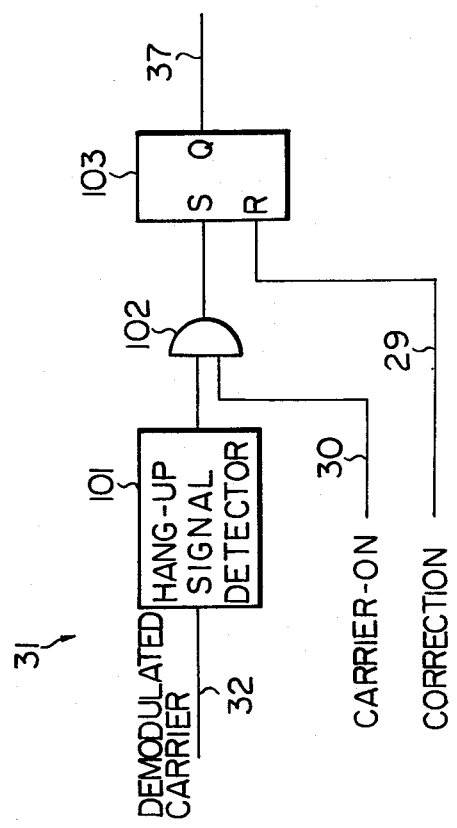
FIG. 6 is an electrical schematic diagram, partially in block form, of a status monitor of the transmitter.
Figure 7:
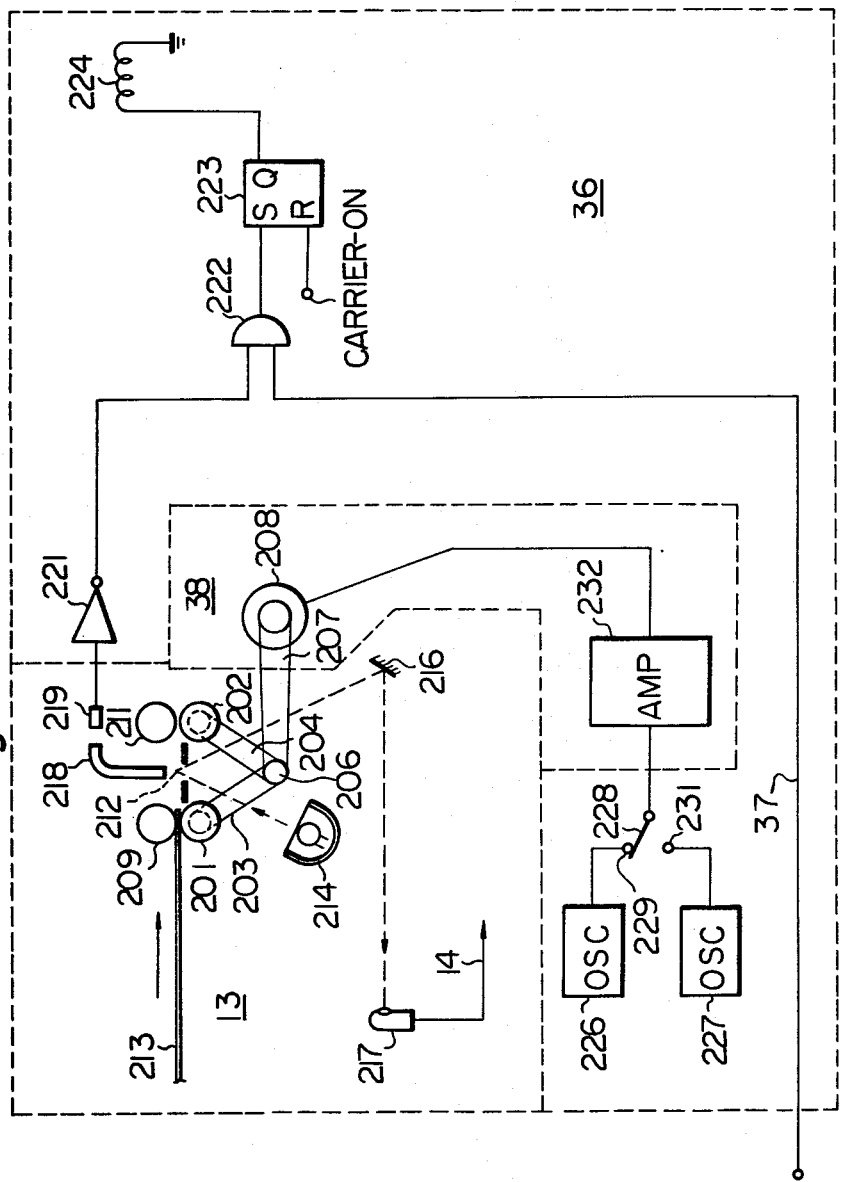
FIG. 7 is a partial schematic diagram of the transmitter.

FIGS. 5 to 7 illustrate examples of circuitry provided to the facsimile transmitter 11 and receiver 12 to embody the failure mode control function described above. The Figures are simplified to facilitate explanation and generally include only the failure mode control circuitry since the circuitry for effecting normal operation of the facsimile system is not the subject matter of the present invention.

FIG. 5 illustrates the status monitor 58 of the receiver 12 which comprises an input shift register 71, the video data being applied to the input of the shift register 71 from the reception control unit 47. The clock pulses are also applied to the shift register 71 through an AND gate 72 in such a manner that the video data is serially input into the shift register 71 in synchronism with the clock pulses. A carrier-on signal is produced by the reception control unit 47 indicating that the carrier signal is being received and is applied to another input of the AND gate 72 in such a manner as to enable the AND gate 72 only during transmission of graphic data.

Parallel outputs of the shift register 71 are connected to a synchronization signal decoder 73 which produces an output when the synchronization bits of each block are loaded into the shift register 71. This signal is applied to reset inputs of a data bit counter 74 and a check code generator 76 to clear and initialize the same. The data bits following the synchronization bits are then serially entered into the shift register 71. The output of the AND gate 72 is connected to the count input of the data bit counter 74 so that the counter 74 is incremented each time a bit is entered into the shift register 71. The data bit counter 74 is also utilized in separating the data bits from the other bits of the data in each block.

The data bits are fed from the shift register 71 to the input of the check code generator 76 which synthesizes a check code from the data bits. A block end decoder 77 is connected to the data bit counter 74 to detect when the last check bit of the block has been entered into the shift register 71. The output of the block end decoder 77 is connected to inputs of AND gates 78 and 79 to enable the same upon detection of the end of the block.

Outputs of the shift register 71 and the check code generator 76 are connected to inputs of a coincidence detector 80, the output of which is connected to a non-inverting input of the AND gate 78 and to an inverting input of the AND gate 79. The coincidence detector 80 compares the check code synthesized by the check code generator 76 from the data bits with the check bits transmitted at the end of the block. If the transmission is true the bits of the check code and the check bits are identical and the coincidence detector 80 produces a logic "1" output. If the transmission is faulty, the bits will not match and the coincidence detector 80 will produce a logic "0".

The output of the AND gate 78 is connected to a count input of an up-counter 81, the overflow output of which is connected to a shift left input of a bi-directional shift register 82. The output of the AND gate 79 is connected to the reset input of the counter 81 and also to the shift-right input of the shift register 82. The left data input of the shift register 82 is hard-wired to logic "1" and the right data input of the shift register 82 is hard-wired to logic "0". The right output of the shift register 82 is connected to an input of an OR gate 83 and the left output of the shift register 82 is not used and is not shown. A transmission-end signal is applied to another input of the OR gate 83 from reception control unit 47 upon completion of reception. The output of the OR gate 83 is connected to an input of an AND gate 84, another input of which is connected to receive the carrier-on signal. The output of the AND gate 84 is connected to the control input of an analog gate 86, the output of which is connected to the modulator 61. The input of the analog gate 86 is connected to an oscillator 87 which generates a signal at the frequency of the hang-up signal. The carrier-on signal is also applied to the input of the analog gate 89, the output of which is connected to the control input of an analog gate 89. An oscillator 91 is connected to the input of the analog gate 89, the output of which is connected to the modulator 61. The oscillator 91 generates a signal at the frequency of the answerback signal.

In operation, the block end decoder 77 enables the AND gates 78 and 79 when the check bits have been entered into the shift register 71 and the coincidence detector 80 produces an output indicating whether the block was transmitted without malfunction. A logic "1" output indicates that the transmission was without malfunction and is gated through the AND gate 78 causing the counter 81 to increment. A logic "0" output is gated through the AND gate 79 causing the counter 81 to reset and also causing the shift register 82 to shift right. Each time the shift register 82 shifts right, a logic "1" is entered into the left input thereof and any logic "1's" already in the shift register 82 are shifted toward the right output. If so many incorrectly transmitted blocks are detected that a logic "1" is shifted from the left input to the right output of the shift register 82, the logic "1" at the right output is gated to the analog gate 86 through the OR gate 83 and AND gate 84 thereby enabling the analog gate 86. Thus, it is noticeable that the shift register 82 constitutes an error threshold circuit. The output of the oscillator 87 is thereby gated to the transmitter 11 through the analog gate 86, modulator 61 and line control unit 42 as the hang-up signal. Since the OR gate 83 and AND gate 84 will also produce a logic "1" output in response to the transmission-end signal, the hang-up signal will also be fed to the transmitter 11 when the receiver 12 has completed reception of the transmitted data in such a manner that the transmitter 11 will be reset either by a detected failure or the end of reception.

If the output of the coincidence detector 80 is logic "0", the counter 81 will be incremented. When the number of blocks transmitted correctly without an intervening malfunction exceeds the capacity of the counter 81, the counter 81 will produce an overflow signal which causes the shift register 82 to shift left, thereby entering a logic "0" into the right input of the shift register 82 and shifting any logic "1's" in the shift register 82 away from the right output.

If the output of the AND gate 78 were connected directly to the shift left input of the shift register 82, a hang-up signal would be generated when the number of incorrectly transmitted blocks exceeded the number of correctly transmitted blocks plus the capacity of the shift register 82. The incorporation of the counter 81 enables the status monitor 58 to detect a much lower failure rate which is equal to the above difference between incorrectly and correctly transmitted blocks divided by the capacity of the counter 81. The shift register 82 and counter 81 constitute a failure rate detector which can detect very small failure rates simply by providing the counter 81 with a large capacity.

When the carrier signal is first received by the receiver 12, the carrier-on signal is applied to the multivibrator 88 which enables the analog gate 89 for a predetermined length of time thereby gating the output of the oscillator 91 to the transmitter 11 through the modulator 61 and line control unit 42 to produce the answerback signal.

FIG. 6 illustrates the portion of the status monitor 31 of the transmitter 11 which controls the scan signal generator 36 to reset the scanner 13 in response to the hang-up signal. The demodulated carrier signal is applied to the input of a hang-up signal detector 101 through the line 32 from the demodulator 28. The detector 101 comprises a bandpass filter (not shown) which is tuned to the frequency of the hang-up signal and is designed to produce a logic "1" output in response to the hang-up signal. The output of the detector 101 is connected to an input of an AND gate 102, another input of which receives a logic "1" signal from the demodulator 28 through the line 30 when the carrier signal is being produced and transmission is in progress. The output of the AND gate 102 is connected to the set input of a flip-flop 103, the reset input of which is connected to the line control unit 24 through the line 29 to receive a logic "1" signal when the transmitter 11 is connected to the telephone network 26. The output of the flip-flop 103 is connected to the scan signal generator 36 through the line 37.

In operation, the flip-flop 103 is reset when the transmitter 11 is connected to the telephone network 26 to call the receiver 12 and feeds a logic "0" output through the line 37 which controls the scan signal generator 36 to operate at scan speed. In response to the hang-up signal from the receiver 12, the detector 101 produces a logic "1" output which is gated through the AND gate 102 to set the flip-flop 103. The flip-flop 103 produces a logic "1" output which switches the scan signal generator 36 to reset speed.

FIG. 7 shows the scanner 13 and portions of the scan signal generator 36 and print drive unit 38 required to switch the scanner 13 between scan and reset speed operation. The scanner 13 comprises feed rollers 201 and 202 which are driven for rotation from a drive motor 208 by means of an idler pulley 206 and belts 203, 204 and 207 drivably interconnecting the rollers 201 and 202 with the idler pulley 206 and motor 208. The drive rollers 201 and 202 cooperate with idler rollers 209 and 211 to feed an original document 213 rightwardly past a scanning slit 212. A light source 214 illuminates the document 213 through the slit 212 and an optical image of the portion of the document 213 illuminated through the slit 212 is reflected by a mirror 216 onto a photosensor array 217. The output of the photosensor array 217 constitutes the primary video data which is fed to the video processor 16 through the line 14.

When the document 213 is not in the scanning position, the light from the light source 214 impinges on an optical fiber 218 which conveys the light to a photosensor 219. The photosensor 219 is connected through an inverter 221 to an input of an AND gate 222 in such a manner that the inverter 221 produces a logic "0" output when the document 213 is not in the scanning position. Conversely, when the document 213 is in the scanning position it blocks the light from the light source 214 so that no light is conveyed to the photosensor 219 through the optical fiber 218. Thus, the inverter 221 produces a logic "1" output to enable the AND gate 222 while the document 213 is being scanned.

The output of the flip-flop 103 of the status monitor 31 is connected to another input of the AND gate 222 through the line 37. The output of the AND gate 222 is connected to a set input of a flip-flop 223, the reset input of which is connected to receive the carrier-on signal. The output of the flip-flop 223 is connected to a relay coil 224.

The scan signal generator 36 comprises a scan oscillator 226 and a reset oscillator 227. A movable relay contact 228 is controlled by the relay coil 224 in such a manner as to make contact with a fixed contact 229 connected to the output of the scan oscillator 226 when the relay coil 224 is de-energized and to make contact with a fixed contact 231 connected to the output of the reset oscillator 227 when the relay coil 224 is energized. The movable contact 228 is connected to the input of an amplifier 232 of the scan drive unit 38, the output of which is connected to the coil (not designated) of the drive motor 208.

In operation, the flip-flop 223 is initially reset by the carrier-on signal at the beginning of transmission so that the low output of the flip-flop 223 de-energizes the relay coil 224 which causes the scan oscillator 226 to be connected to the amplifier 232. The scan oscillator 226 produces an output signal at a frequency suitable for scanning the document 213 which is amplified by the amplifier 232 and utilized to drive the motor 208. The document 213 is thereby fed by the feed rollers 201 and 202 to effect scanning.

If, with the document 213 in the scanning position and the inverter 221 producing a logic "1" output the output of the flip-flop 103 of the status monitor 31 should go to logic "1" in response to reception of the hang-up signal from the receiver 12, this logic "1" signal will be gated through the AND gate 222 to the flip-flop 223 thereby setting the flip-flop 223 and causing the same to produce a logic "1" output to energize the relay coil 224. This causes the movable contact 228 to connect the reset oscillator 227 to the amplifier 232 so that the signal from the reset oscillator 227 is applied to the drive motor 208. The reset oscillator 227 is designed to produce a drive signal at a much higher frequency than the scan oscillator 226 so that the drive motor 208, which is preferably of the synchronous type, is driven at a much higher speed to reset the scanner 13 to its initial ready-for-transmission status. A limit switch or the like (not shown) de-energizes the motor 208 when the document 213 is clear of the scanner 13.

Although the portions of the status monitor 58, print signal generator 64 and print drive unit 67 of the receiver 12 which reset the receiver 12 in response to a hang-up signal from the transmitter 11 are not shown, they are essentially similar to those of the corresponding units in the transmitter 11.

In FIG. 5, the left and right shift inputs and hard-wiring of the shift register 82 may of course be interchanged and the up-counter 81 may be replaced by a down-counter which is suitably arranged to produce the same result as the failure rate detector shown and described. Many other modifications within the scope of the invention will become possible for those skilled in the art after receiving the teachings of the present disclosure.

What is claimed is:

1. In an electronic data transmission system including a transmitter and a receiver, a failure mode control apparatus comprising:
    transmitter failure sensing means provided to the transmitter to detect a transmitter failure;
    transmitter failure signal generator means provided to the transmitter to generate a transmitter failure signal in response to the detected transmitter failure and transmit the transmitter failure signal to the receiver;
    transmitter reset means provided to the transmitter to reset the transmitter to an initial status thereof in response to the detected transmitter failure;
    receiver failure sensing means provided to the receiver to detect a receiver failure;
    receiver failure signal generator means provided to the receiver to generate a receiver failure signal in response to the detected receiver failure and transmit the receiver failure signal to the transmitter; and
    receiver reset means provided to the receiver to reset the receiver to an initial status thereof in response to the detected receiver failure, the receiver reset means being further operative to reset the receiver to the initial status thereof in response to the transmitter failure signals;
    the transmitter reset means being further operative to reset the transmitter to the initial status thereof in response to the receiver failure signal.

2. A system as in claim 1, in which the transmitter comprises an optical scanner and scanner drive means operative to drive the scanner at a scan speed for data transmission, the transmitter reset means being operative to control the scanner drive means to drive the scanner at a reset speed which is higher than the scan speed to reset the transmitter to the initial status thereof;

the receiver comprising a printer and printer drive means operative to drive the printer at a print speed for data reception, the receiver reset means being operative to control the printer drive means to drive the printer at a rest speed which is higher than the print speed to reset the receiver to the initial status thereof.

3. A system as in claim 2, in which the transmitter and receiver are connected by a telephone system, the transmitter and receiver failure signals being generated at a frequency equal to a frequency of a telephone system busy signal.

4. A system as in claim 1, in which data is transmitted in the form of digital blocks each comprising data bits and a check bit, the receiver failure sensing means comprising:
 a check code generator to synthesize a check code in accordance with the data bits of each respective block; and
 a comparator to compare the check code with the check bit of each respective block and actuate the receiver failure signal generator means and the receiver reset means in response to a lack of correspondence between the check codes and the check bits.

5. A system as in claim 4, in which the receiver failure sensing means further comprises a failure rate sensor responsive to the comparator and operative to actuate the receiver failure signal generator means and the receiver reset means when a ratio of received data blocks for which a lack of correspondence between the check codes and the check bits is sensed to received data blocks for which correspondence between the check codes and the check bits is sensed exceeds a predetermined value.

6. A system as in claim 5, in which the failure rate sensor comprises a bi-directional shift register which is hard-wired so that a logical one is applied to a left input thereof and a logical zero is applied to a right input thereof, a right output of the shift register being connected to the receiver failure signal generator means and the receiver reset means, the comparator being connected to the shift register in such a manner that the shift register is caused to shift left in response to correspondence between check codes and check bits and shift right in response to lack of correspondence between check codes and check bits, the receiver failure signal generator means and the receiver reset means being actuated by a logical one at the right output of the shift register.

7. A system as in claim 6, in which the failure rate sensor further comprises an up-counter connected to the comparator in such a manner as to count up in response to correspondence between a check code and a check bit and reset in response to lack of correspondence between a check code and a check bit, the comparator being further connected to a shift right input of the shift register in such a manner as to cause the shift register to shift right in response to lack of correspondence between a check code and a check bit, an overflow output of the up-counter being connected to a shift left input of the shift register in such a manner as to cause the shift register to shift left in response to an overflow condition of the up-counter.

* * * * *